United States Patent Office 3,356,538
Patented Dec. 5, 1967

3,356,538
ELECTRODEPOSITED ION EXCHANGE MEMBRANE AND METHOD OF FORMING
Richard G. Miekka, Natick, Ernest H. Lyons, Jr., Marblehead, and Russell M. Dempsey, Hamilton, Mass., assignors to General Electric Company, a corporation of New York
No Drawing. Filed Sept. 29, 1964, Ser. No. 400,228
15 Claims. (Cl. 136—120)

This invention relates to a process for depositing extremely thin layers of metals onto nonmetallic bases and to the products produced by the process. More particularly, this invention relates to a method for electrolytically depositing catalytically active metals for use as electrodes onto a base and subsequently transferring the deposit to an ion exchange membrane and to the electrode-membrane assemblies so produced.

Ion exchange membrane-electrode assemblies for use in electrochemical cells, particularly fuel cells and gas purification cells utilizing a fuel cell structure, comprise a thin membrane of an ionic conductive synthetic organic resin having adjacent to each side a thin layer of an electrically conductive catalytic metal which serve as the oxidation and reduction electrodes. Two methods have previously been shown for forming these electrodes on the membrane; each is subject to certain limitations.

The first method of forming a catalytically active electrode on an ion exchange membrane involves a vacuum deposition. For best results in electrochemical cells the surface of the catalytically active metal electrode adjacent the ion exchange membrane should be rough because a rough surface provides a greater catalytic activity. A vacuum deposition inherently creates a metallic layer which is smooth adjacent the membrane. Additionally, due to the high temperatures which must be utilized in a vacuum deposition the membrane is likely to dehydrate during processing. On rehydration, considerable expansion of the membrane is to be expected which often results in disruption of the continuity of the catalytic metal coating.

A second method for forming such assemblies is described in the copending application of Leonard W. Niedrach, Ser. No. 108,418, filed May 8, 1961, and assigned to the same assignee as the present invention. That process of electrode formation involves mixing a catalytic material with a resinous binder and curing the mixture under pressure at a temperature of about 650° F. While a completely satisfactory electrode is formed, the Niedrach process is not without limitations. In the first instance, the use of a mixture of resin and catalytic material necessarily produces a somewhat thicker electrode than would be produced if only catalytic material were used. Second, the limitations on uniform application encountered with the Niedrach process require that an excess of catalytic material be applied to ensure efficient electrode operation over every unit of area. Finally, catalytic material held in a resin binder does not form as active an electrode as could be formed from an equivalent portion of catalytic material applied per se.

In accordance with the present invention, it has been found that an electrode having excellent performance characteristics may be formed by electrolytically depositing catalytic material in a fine layer onto a conducting base and directly transferring such catalytic material from the conducting base to the ion exchange membrane. Not only is the method more facile than the previously described methods, but superior properties are obtained and a savings of material is realized.

It is, therefore, one object of this invention to provide a facile method for economically forming catalytic electrodes for ion exchange membranes.

It is a further object of this invention to provide a method for forming catalytic electrodes for ion exchange membranes by electrolytic deposition of catalytic material.

It is a still further object of this invention to produce ion exchange membranes having extremely thin catalytic electrodes.

Briefly, in accordance with this invention, catalytically active, conducting material is electrolytically deposited upon a conducting base. The base may be, for example, a single plate, moving endless belt, or a moving drum. The deposit is washed and dried while still in contact with the base and is then transferred, utilizing heat and pressure, directly to an ion exchange membrane. The process may be conducted in either a batch manner or in a continuous manner and a conducting base in a form other than those just mentioned, which serve the same function, may as easily be utilized.

The process of the present invention and the product produced will now be described in greater detatil.

The conducting base on which electrocatalyst is deposited includes smooth, relatively inert materials, such as, stainless steel or Monel. These metal substrates, following transfer of the deposited electrocatalyst to an ion exchange membrane, may be replated and reused. This is true whether the process is run as a batch or a continuous operation. Other possible metal substrates for the electrodeposition include Nichrome, tantalum, and in general any conductive metal which is resistant to corrosion in the plating bath and to which the metal being plated is not strongly adherent. This includes metals which have passive conductive metal oxide coatings at their surface.

Electrolytic depositions tend to produce a coating which is smooth at the surface of the deposition in contact with the base. Subsequently deposited material has a blackened or rough configuration. The smoothness of the initial layer is due to the tendency of the deposited material to conform to the surface upon which it coats. When such a coating is transferred to the ion exchange membranes, the rough, black surface is embedded in the membrane, while the smooth surface is exposed. Since the catalytic activity of the electrode is highest at a black or roughened surface, this method produces electrode membrane assemblies of the highest possible efficiency.

A wide variety of methods are available for forming the electrolytic deposition on the conducting base. The material deposited may be either an alloy or an elemental metal and the configuration of the deposit may be modified during or subsequent to deposition. The types of alloys contemplated are alloys of catalytically active metals and alloys having one component formed of catalytically active metals and another component formed of materials capable of being removed by a solvent.

When one component of the alloy is a catalytically active metal while the other component is a material which may be removed by a solvent to which the catalytically active material is inert, the process steps will consist of:

(1) electrolytically depositing an alloy onto a conductive base,
(2) washing the deposit to remove the residue of the deposition bath,
(3) applying a solvent to etch the noncatalytic material,
(4) washing the remaining catalytic structure to remove the residue of the etching solvent,
(5) drying the etched catalytic structure, and
(6) transferring the catalytic structure from the conductive base to the ion exchange membrane.

The usual structure formed by this operation is a spongy, porous, uniform layer of a catalytically active material. An example process is the deposition of an alloy of platinum and silver by electrolysis and the subsequent etching of the silver to leave a Raney-type of platinum catalyst on the conductive base. Such a material is extremely active and forms an excellent oxygen electrode. It will be appreciated that the catalytically active material may itself be an alloy of a plurality of elements.

The deposition of an alloy and its subsequent etching and transfer to the membrane may obviously be conducted in either a batch or a continuous manner. Thus, an alloy may be deposited upon a plate which is the same size, or slightly larger in size, than the desired final electrode. The plate with the deposit may then be washed, dried, etched, and subsequently placed in contact with an ion exchange membrane for bonding the electrode to the membrane. On the other hand, an alloy may be deposited on a moving belt or drum which moves through various zones, a different one of the above-described operations being performed in each zone. A continuous strip of an ion exchange resin having one or more bonded electrode surfaces thus results and the strip may subsequently be cut to form membranes of the desired size. Electrodes can be simultaneously bonded to both sides of the membrane.

Methods for the electrodeposition of alloys may generally be found in the treatise of Abner Brenner, entitled, "Electrodeposition of Alloys," Academic Press, New York (1963), which is in two volumes.

The catalytic electrode may also be deposited as a component consisting entirely of catalytically active material. This material is chosen from the platinum group metals which include platinum, palladium, iridium, rhodium, and ruthenium. Using the proper deposition conditions, any of these metals may be deposited as a "black." Such a deposit has a smooth shiny surface adjacent the conductive base and roughened, black surface on the surface opposite the base. Thus, on transfer to the ion exchange membrane, a rough surface is presented adjacent the membrane providing high catalytic activity while the surface of the electrode away from the membrane is shiny and smooth, allowing easy electrical connection and transfer.

Platinum, for example, may be deposited from a water solution containing chloroplatinic acid ($H_2PtCl_6$) in an amount of approximately 3 percent and a trace of plumbous acetate (approximately 0.2 g. per liter). The purpose of the lead acetate is to increase the catalytic activity of the deposited platinum. The platinum deposition is carried out at a potential of approximately 0.250 volt. More important is to maintain the current density at the cathode on which the deposit is coated at 5–500 milliamperes per square centimeter, preferably from 10 to 100. Under these conditions, maximum catalytic activity of the platinum black is obtained. Room temperature is acceptable during the deposition. The deposition of a palladium black is carried out in a manner similar to that used for platinum. Here, however, the solution should contain approximately 3 percent palladium chloride ($PdCl_2$) and about 50 ml. of hydrogen chloride in a liter of deposition solution. The conditions for palladium are also applicable to iridium, ruthenium, and rhodium.

The electrical efficiency of the platinum and palladium deposition is in the range of about 20 percent. A calculation for the current required to deposit platinum to a concentration of 1 milligram per square centimeter is as follows:

(1) Molecular weight of platinum=195.

(2) $$1 \text{ mg. Pt} = \frac{1}{195 \times 10^3} \text{ moles} = 5 \times 10^{-6} \text{ moles}$$

(3) As the valence of Pt in chloroplatinic acid is 4, the number of equivalents/cm.$^2$ is $4 \times 5 \times 10^{-6} = 2 \times 10^{-5}$ equivalents/cm.$^2$.

(4) $10^5$ coulombs/equivalent are necessary for deposition.

(5) Thus, 2 coulombs/cm.$^2$ are necessary which is the same as 2 amp-sec./cm.$^2$.

Since the efficiency of the deposition is approximately 20 percent, the number of amp-sec. necessary for 1 milligram is approximately 10. Power requirements for the other platinum group metals may be similarly computed.

The density of the coating on the conducting base may be varied over a wide range, but because of the cost of the noble metals, a minimum effective amount of materials should be used. The density limits would be from 0.01 mg./cm.$^2$ to 100 mg./cm.$^2$. This is the useful range of activity, but at the lower level the conductivity of the electrode is poor while at the higher level there is not full utilization of the catalytic coating. A preferable range is from 0.1 mg./cm.$^2$ to 10 mg./cm.$^2$. In view of the desired deposition density and the power requirements for deposition, the time should range up to about 5 minutes, preferably from 1 to 2 minutes. Thicknesses vary a great deal depending upon the porosity of the coating, but are generally in the range of from 100 A. to about 1 millimeter.

After the electrolytic coating is formed on the conducting base, it is washed, as with distilled water, and dried prior to transfer to the ion exchange membrane. The transfer to the membrane may be accomplished by the application of heat and/or pressure and, additionally, by the use of an adhesive material or solvent for the membrane polymer. A swelling solvent or plasticizer for the ion exchange membrane can be used to aid the transfer in many cases. For example, an ion exchange membrane containing a mixture of polyvinylidine fluoride and polytrifluorochloroethylene may be swelled by the incorporation of methanol. A sulfonated styrene polymer may be swelled by the incorporation of alcohols, ketones, amines, dimethylformamide, and dimethylsulfide. The temperature during the transfer of the catalytic electrode from the conducting base to the membrane polymer should be high enough to soften the membrane, or at least a component of it when the membrane is formed of a polymer mixture. The softening should be sufficient to allow the resinous material to flow and form a good bond with the metal electrode. An example of a temperature sufficient to soften one type of ion exchange membrane containing a copolymer of trifluorochloroethylene and vinylidine fluoride is 200–250° F. The best transfer for this material is achieved at the highest end of the temperature range. However, if the temperature is too high or the assembly is heated for too long a period of time, dehydration, degradation, and embrittlement of the membrane may occur.

A wide range of pressures are usable for the transfer, but the pressure must be sufficient to produce an intimate contact between the membrane and the catalytic electrode coating. A workable pressure range is from 1000 p.s.i. to 10,000 p.s.i., preferably about 2,000 p.s.i. This pressure range not only provides sufficient contact between the materials to be joined but additionally allows a penetration of the electrode to a depth required for proper functioning of the cell in which the membrane-electrode assembly is subsequently used. This penetration is preferably in the range of from 100 to 1000 A. It can be even greater.

The polymer flow rate varies, of course, with the temperature and pressure applied during the transfer and with the particular polymer which is used. However, to avoid membrane degradation by overheating during the transfer the contact time under transfer conditions should be kept to a minimum. Five minutes or less is sufficient to provide adequate bonding, and a preferable time is about one minute. The problems of degradation due to overheating may be substantially lessened by sealing the edges of the membrane prior to bonding the electrode to it. One method of sealing the membrane during the bonding is the use of a shim, the inner dimensions of which are the same as those of the membrane and the thickness of which is equivalent to that of the membrane under the conditions of temperature and pressure to be used.

The ion exchange membranes to which the catalytic electrode can be transferred by the methods just described are limited to those which can be softened by heat, pressure, solvents, plasticizers, etc. Among these membranes are included any of the ion exchange polymers currently in use. Generally, all thermoplastic ion exchange polymer materials and some cross-linked materials can be used. Among the cross-linked polymers is the copolymer of styrene and divinylbenzene. Included among these ion exchange polymers are, generally, organic-base polyelectrolyte resins, either cation or anion exchange types, either singly or contained in an inert matrix polymer such as polyvinylidine fluoride, polyethylene, and other substituted and unsubstituted polymers.

Refractory inorganic membranes may be employed as well as the organic membranes above described. In view of the high temperature resistance of refractory membranes, bonding of the electrodes may be achieved by applying sufficient heat and pressure to soften the electrode during application. Inorganic membranes which may be used are those composed of zirconia or calcia-doped zirconia, for example.

After the catalytic electrode is transferred to the ion exchange membrane, additional amounts of the same metal or of different metals may be coated onto the outside of the electrode. The electrode which is transferred is smooth-surfaced and conductive on the side away from the membrane and, thus, normal electroplating techniques may be used. Care must be taken to avoid using baths which contain chemicals injurious to the membrane. Baths normally used for depositing nickel, aluminum, and iron, for example, are detrimental to normal ion exchange membranes; essentially only noble metals may be plated onto the transferred electrode. Additional metal might be plated, for example, when the electrode has been transferred to a porous membrane which is designed to contain a liquid electrolyte during actual operation. The additional catalyst is then deposited to provide additional reaction sites.

A further purpose of the additional metal is to provide additional conductivity and insure continuity of the electrical contact with the electrode. This can also be accomplished by using a screen placed against the transferred electrode. Such a screen has the additional advantage of avoiding the problems of cracking following dehydration. Among the screens which may be used are those formed of platinum,, titanium containing 0.2 percent palladium, tantalum, gold, and any other metal which is corrosion-resistant to the membrane under the electrochemical conditions at which the cell operates. The screens may be formed, for example, of expanded metal having U.S. Standard Sieve Sizes of, for example, 50 or 60 which corresponds to meshes 48 and 60, respectively, and wire diameters of 0.0092 and 0.0070 inch, respectively. The screens may either be pressed against the electrode surface or may be permanently mounted to the membrane-electrode assembly under the same conditions as those used to transfer the original electrocatalyst coating.

Additionally, without regard to whether a subsequent metal layer is deposited or whether a screen is used, wet-proofing agents may be placed over the outside surface of the electrode surface. Usable wet-proofing agents are those which can be applied by brushing, spraying, or electrodeposition, and which can be cured at temperatures sufficiently low to avoid damage to the membrane. The wet-proofing agent must be stable under the operating conditions of the cell. Suitable agents which meet the above-cited requirements include fluorinated hydrocarbon polymers, such as polytrifluorochloroethylene, Dynel, a copolymer of vinyl chloride and acrylonitrile, fluoro-carbon waxes, ceresin wax, etc. Materials which require a high temperature cure may also be used, but are not as desirable as those materials just mentioned. Among the materials requiring a high temperature cure is polytetrafluoroethylene which may be applied only by an application to the metal film and curing prior to transfer to the membrane.

The purpose of wet-proofing agents, when used, is to prevent flooding of the electrode pores by the water produced in the fuel reaction. Flooding of the electrode pores prevents the reaction gases from reaching the membrane-catalyst interface where reaction occurs, thus "starving" the electrode.

The following examples are given by way of illustration and should not be considered as limiting in any way the full scope of the invention as covered by the appended claims.

*Example 1*

Two sheets of type 321 stainless steel, each 0.006 inch thick, were platinized for 5 minutes at a current density of 50 ma./in.$^2$, in an aqueous solution containing 3 percent chloroplatinic acid and 0.025 percent lead acetate. The amount of platinum deposited was estimated to be approximately 0.2 mg./cm.$^2$. After thoroughly rinsing the deposited platinum with distilled water, the black platinized surfaces were dried and placed in contact with opposite sides of a 0.010 inch thick cation exchange membrane formed of a cross-linked polystyrene sulfonic acid contained in a matrix of a polychlorotrifluoroethylene-polyvinylidine fluoride copolymer. The membrane-platinum surfaces were heated to 250° F. for 5 minutes in a hydraulic press at a pressure of approximately 2000 p.s.i. The platinum transferred completely from the stainless steel sheets to the membrane, giving the membrane a bright metallic lustre on each surface.

The membrane having the fixed platinum electrodes was mounted in a fuel cell fixture such as that described in U.S. Patent 2,913,511, Grubb, assigned to the same assignee as the present invention. Platinum screen current collectors were placed against each of the two platinum electrode surfaces. The structure was tested as a hydrogen purification device, such as that described in the copending application of Henri Maget, Ser. No. 385,925, filed July 29, 1964, and assigned to the same assignee as the present invention.

The resistance-free polarization of the cell increased linearly with increasing current density to a value of 0.013 volt at 100 ma./cm.$^2$. (This is equivalent to a calculated 41.7 cc. of $H_2$/hr./cm.$^2$ at standard temperature and pressure.) The total polarization (including IR potential drops) was 0.181 volt, of which 0.048 volt occurred at the anode, the hydrogen consumption side. This anode polarization is the same as that which could be expected at the same current density with the electrode operating on the hydrogen side of a hydrogen-oxygen fuel cell.

Oxygen was substituted for hydrogen on the cathode side of the cell and a limiting current density of 100 ma./cm.$^2$ was drawn. Only 0.024 volt polarization was observed on the hydrogen side (IR drop included). A plot of cell voltage versus current density had a sharp downward curvature near the limiting current value, indicating that oxygen diffusion was rate limiting.

*Example 2*

The electrode fabrication and application procedure of Example 1 was repeated except that the platinum chloride solution was replaced with a 3 percent palladium chloride solution. The amount of palladium deposited was estimated to be approximately 0.1 mg./cm.$^2$. Following transfer of the palladium electrodes to the membrane surface current collectors were bonded to the assembly. The current collectors consisted of gold powder (325 mesh) bonded with 10 percent polytetrafluoroethylene. The current collectors were applied to the assembly at 8,000 p.s.i. at a temperature of 250° F. for 5 minutes. When this device was placed in a fuel cell assembly such as that described in Example 1 and operated as a hydrogen purification device, an IR-free polarization of 0.095 volt was observed and a total polarization of 0.43 volt at a current density of 100 ma./cm.$^2$ was observed. Of the total polarization, 0.192 volt occurred at the anode.

*Example 3*

The electrode fabrication and application procedure of Example 1 was repeated except that the platinum chloride solution was replaced with a solution containing 2 percent palladium chloride and 1 percent iridium chloride.

*Example 4*

A 100 ml. solution was prepared containing 12.5 grams/liter of platinum chloride, 1.5 grams/liter of rhodium chloride, and 20 grams/liter of sodium nitrite. The solution was heated until the color changed to a pale yellow. Fifty ml. of 0.01 N ammonia water were then added. Two sheets of stainless steel 0.006 inch thick were plated at 100 amp/cm.$^2$ current density and a bath temperature of about 80° C. until an estimated 0.3 mg./cm.$^2$ of alloy was deposited. A platinum anode was used. The alloy was determined to be 90 percent platinum and 10 percent rhodium. The alloy was subsequently processed and fabricated according to the steps of Example 1.

*Example 5*

Two support sheets of stainless steel as described in Example 1 were used as substrates for the deposition of an alloy. An electroplating bath was prepared using a solution consisting of 500 grams/liter lithium chloride, 4 grams/liter chloroplatinic acid, 40 milliliters/liter hydrochloric acid having a specific gravity of 1.12, and sufficient silver chloride to produce a saturated solution (approximately 18 grams/liter). The solution was held at a temperature of 80° C. and plating of an alloy was accomplished using a current density of 0.2 amp/cm.$^2$. Plating was continued for about twenty minutes onto the support sheets.

The deposited alloy was subsequently rinsed with 10 N LiCl and then water, and the alloy layer was determined to be 20–30 percent by weight silver and 70–80 percent by weight platinum. The support with the alloy layer attached was dipped into nitric acid having a specific gravity of 1.4 for a period of twenty seconds. The electrodeposited layer upon removal from the acid was noted to be blackened. This was attributed to silver removal leaving a high surface area platinum deposit. The platinum black layer remaining was rinsed to remove the acid residue and subsequently dried.

The steps of transfer and mounting of the platinum black layer to form a complete ion exchange membrane assembly were performed according to Example 1.

It can be seen that a useful method for forming an electrode-ion exchange membrane assembly for use in fuel cells and gas purification cells has been shown. This method produces assemblies containing catalytic activity at the proper point in the structure and requires a minimum of expensive catalytic material for proper operation. Because of the savings of material and uniformity with which an electrodeposition may be carried out, extremely thin electrodes may be formed. These are the thinnest, practical catalytic electrodes which have yet been made and are extremely useful, for example, in situations where a high power output is desired for a short period of time. In such use, the thinnest possible stack is desired, and thus the thinness of the catalytic electrode on the various ion exchange membranes is of extreme importance.

While specific embodiments of the invention have been shown and described, the invention should not be limited to the particular methods of formation and compositions exemplified. It is intended, therefore, by the appended claims to cover all modifications within the spirit and scope of this invention.

What we claim as new and desire to secure by Letters Patent of the United States is:

1. A process for applying electrodes of catalytically active metals to ion exchange membranes comprising:
   electrolytically depositing a thin layer of catalytically active platinum group metal onto an electrically conducting base,
   washing the deposit to remove the residue of the deposition bath,
   drying the washed electrodeposited metal,
   placing an ion exchange membrane in contact with said electrodeposited catalytic metal,
   applying heat and pressure to the assembly to bond the catalytically active metal to the ion exchange membrane, and
   removing the ion exchange membrane, with the layer of electrodeposited metal attached, from the conducting base.

2. The process of claim 1 wherein said process is conducted continuously.

3. The process of claim 1 wherein said conducting base is of the exact dimensions of the desired electrode and said process is conducted as a batch process.

4. The process of claim 1 wherein said thin layer is an alloy of platinum group metals.

5. The process of claim 1 wherein said catalytically active platinum group metal is originally deposited as a component of an alloy, the remainder of said alloy having been removed by etching.

6. The process of claim 1 wherein two electrodeposited catalytically active metal electrodes are simultaneously placed on opposite sides of an ion exchange membrane.

7. The process of claim 1 wherein current collecting material is appplied to said electrodes.

8. A process for applying electrodes of catalytically active metals to ion exchange membranes comprising:
   electrolytically depositing a thin layer of an alloy consisting of an noncatalytically active material and a catalytically active platinum group metal onto an electrically conducting base,
   washing the alloy deposit to remove the residue of the deposition bath,
   applying a solvent to etch the noncatalytic material,
   washing the remaining catalytic structure to remove the residue of the etching solvent,
   drying the etched catalytic structure,
   placing an ion exchange membrane in contact with said catalytic structure,
   applying heat and pressure to the assembly to bond said catalytic structure to the ion exchange membrane, and
   removing the ion exchange membrane, with said catalytic structure attached, from said conducting base.

9. The process of claim 8 wherein said process is conducted continuously.

10. The process of claim 9 wherein said conducting base is of the exact dimensions of the desired electrode and said process is conducted as a batch process.

11. The process of claim 9 wherein current collecting material is applied to the face of said electrodes.

12. An electrode-ion exchange membrane assembly including
   an ion exchange membrane having opposed major surfaces,
   an electrode integrally bonded to said ion exchange membrane including
   a first major surface consisting essentially of catalytically active platinum group metal in the form of a black embedded in one major surface of said ion exchange membrane, and
   a second major surface remote from said ion exchange membrane consisting essentially of platinum group metal having a bright metallic lustre.

13. An electrode-ion exchange membrane assembly according to claim 12, including an electrode adjacent each of said opposed major surfaces.

14. A process for applying electrodes of catalytically active metals to ion exchange membranes comprising:
  electrolytically depositing a thin layer of catalytically active platinum onto an electrically conductive base,
  washing the deposit to remove the residue of the deposition bath,
  drying the washed electrodeposited platinum,
  placing an ion exchange membrane in contact with said electrodeposited catalytic platinum,
  applying heat and pressure to the assembly to bond the catalytically active platinum to the ion exchange membrane, and
  removing the ion exchange membrane with the layer of electrodeposited platinum attached, from the conducting base.

15. A process for applying electrodes of catalytically active metals to ion exchange membranes comprising:
  electrolytically depositing a thin layer of catalytically active palladium onto an electrically conductive base,
  washing the deposit to remove the residue of the deposition bath,
  drying the washed electrodeposited palladium,
  placing an ion exchange membrane in contact with said electrodeposited catalytic palladium,
  applying heat and pressure to the assembly to bond the catalytically active palladium to the ion exchange membrane, and
  removing the ion exchange membrane, with the layer of electrodeposited palladium attached, from the conducting base.

References Cited

UNITED STATES PATENTS

| Number | Date | Name | Class |
|---|---|---|---|
| 1,779,457 | 10/1927 | Zschiegner | 204—47 |
| 3,231,428 | 1/1966 | Thompson | 136—86 |
| 3,150,011 | 9/1964 | Winsel et al. | 136—120 |
| 3,134,697 | 5/1964 | Niedrach | 136—86 |
| 2,974,091 | 3/1961 | Neish | 204—35 |
| 2,913,511 | 11/1959 | Grubb | 136—86 |
| 2,164,010 | 6/1939 | Grupe | 156—3 |
| 2,105,440 | 1/1938 | Miller | 156—150 |

FOREIGN PATENTS 232,629 2/1961 Australia.

OTHER REFERENCES

"Physico-Chemical Methods," by Joseph Reilly and William Norman Rae, vol. II, 1954. Page 608 relied on.

WINSTON A. DOUGLAS, *Primary Examiner.*

A. SKAPARS, *Assistant Examiner.*